United States Patent
Conforti

(10) Patent No.: US 7,252,106 B2
(45) Date of Patent: Aug. 7, 2007

(54) SHADE APPARATUS

(76) Inventor: Carl J Conforti, 30 Riverview St., Fall River, MA (US) 02724

( * ) Notice: Subject to any disclaimer, the term of this patent is extended or adjusted under 35 U.S.C. 154(b) by 247 days.

(21) Appl. No.: 10/921,725

(22) Filed: Aug. 19, 2004

(65) Prior Publication Data

US 2005/0247415 A1    Nov. 10, 2005

Related U.S. Application Data

(60) Provisional application No. 60/496,646, filed on Aug. 19, 2003.

(51) Int. Cl.
*E04H 15/58*    (2006.01)

(52) U.S. Cl. ............ 135/117; 135/126; 160/135; 160/351

(58) Field of Classification Search ............. 160/351, 160/352; 135/126
See application file for complete search history.

(56) References Cited

U.S. PATENT DOCUMENTS

| | | | | |
|---|---|---|---|---|
| 5,732,759 A | * | 3/1998 | Wang | 160/370.21 |
| 6,098,349 A | * | 8/2000 | Zheng | 52/126.1 |
| 6,109,281 A | * | 8/2000 | Lowenthal | 135/125 |
| 6,343,391 B1 | * | 2/2002 | Le Gette et al. | 5/417 |
| 6,360,761 B1 | * | 3/2002 | Zheng | 135/126 |
| 6,782,905 B2 | * | 8/2004 | Chu et al. | 135/143 |
| 6,942,005 B2 | * | 9/2005 | Le Gette et al. | 160/368.1 |

* cited by examiner

*Primary Examiner*—Blair M. Johnson

(57) ABSTRACT

A sunshade apparatus configured to inhibit the sun's rays, constructed with a plurality of flexible panels, having the ability to form a three-dimensional shape that provides a compact collapsible structure, and minimum assembly. The sunshade three-dimensional structure has the capability to easily adapt to an object or stand on its own.

11 Claims, 5 Drawing Sheets

SHADE APPARATUS

CROSS-REFERENCED RELATED ACTIONS

This application should benefit the original date of filing for U.S. Provisional Application No. 60/496,646 filed Aug. 19, 2003.

FIELD OF THE INVENTION

This invention relates to sunshades, and more particularly to a collapsible shade structure utilized to obstruct the sun's rays from an object, individual or pet.

BACKGROUND OF THE INVENTION

The sun's light rays, otherwise noted as sun's rays can produce harmful effects with prolonged exposure and may even create serious health risks to humans and other living species. The sun's rays more specifically may effects humans, resulting in sun burns and in extreme conditions may cause skin cancer from long term exposure. The sun's ultra violet rays not only can damage the skin from a prolonged exposure and can also heat objects that are directly exposed to direct sun light. There are many products sold on the market today that provide a barrier from the sun's rays and or limit the exposure on a single plane or that are attached to a planar surface area. Some shade devices are frequently attached to buildings or structures providing a sun screen. These devices are made of separate components and require hardware and tools for installation and removal. These sunshades with multiple components and lose parts are somewhat cumbersome to install and require some mechanical ability and time to construct and disassemble the apparatus. The conditions created by direct sunlight can be especially dangerous for small children with sensitive skin, or even pets that have limited ability to cool their bodies efficiently when exposed to increased temperature levels. Children often kept outdoors and exposed to the sun's rays, are more susceptible to burning and becoming irritated even after a short duration in time. There are sunshades in the market today that help eliminate the direct rays of sun that can be placed on automobiles, windows, and structures and for outdoor activities. These shades are typically cumbersome and time consuming to assemble as a three dimensional structure. Other benefits of blocking UV light and offering extended benefits reducing fading of materials and degrading the properties that may decrease the life of a product or structure. The shades that are commonly found in the market today are constructed in various shapes and sizes are not easy to store and assemble into a three dimensional structure and most often are found to be expensive due to the manufacturing process and number of components. Sun shades found on the market today having multiple components and that may offer a simple method of manufacture, are more commonly difficult to assemble and disassemble. There is a need to have a shade structure that can block the ultra violet suns rays from Humans, pets and objects and that is easy to assemble, disassemble and store in a compact shape. There is also a need to have a device easily adaptable to attach to a structure or stand on its own, providing a collapsible structure to form a barrier from the sun's rays. The option to provide storage and organization is yet another feature that can be useful with the proposed sunshade device.

DESCRIPTION OF THE PRIOR ART

There are sunshades currently sold in today's market that consist of a thin flexible vinyl, or plastic like materials providing somewhat transparent flat product that is commonly used to block the sun's rays through a single plane, panel or flat window structure. These devices are more commonly utilized for applications on automobiles or transport vehicles. sunshades are commonly produced of flexible plastic or textile materials, having a fixed shape or size typically square or round in shape. Sun shades more commonly secured to an object by a mechanical means (e.g. suctions cups) and typically require a clean, flat, smooth surface to adhere the product to an object that is desired to be shaded.

Sun shade's can also be manufactured using a wire attached to or bound by a bias and supporting the main body, where the flat expanded shape can be reduced in size for storage and travel. Sun shades are also made from a sheet of textile like material with a single piece uniform rod that is assembled and supported by a continuous ring member that can be used on an automobile or assembled with other panels to form a barrier and protect from over exposure from the sun's rays.

Umbrella type shades are configured with a pole located in the center have limitations to the positioning and attaching to a structure or even as a stand-alone device. The current sun shades found on the market today can be found providing a one dimensional flat planar shape that can accommodate applications that are on a single face or plane like a car window shade. Stand-alone structures such as cabanas provide an expandable space offering shade and protection from the sun's rays. The cabanas have limitations in the size and portability, along with the limitations to economically manufacture a portable shade device or easily adapt to an existing structure. Canopy structures also exist and require a modest amount of assembly and multiple components that makes the shade structure inconvenient to assemble and disassemble as a temporary shade device. Canopy structures are made in various sizes and shapes requiring specific assembly instructions that may be time consuming to assemble and somewhat confusing for the consumer, especially if there are parts or components missing from the product or package.

There is also consideration of the cost to manufacture the shades and structures that are available in today's market, many utilize multiple components in the design and assembly and some have mechanisms that require expensive manufacturing labor and investment in tooling.

Many of the products that are found in the market today can provide an economical shade device that can block sunlight or UV light on a single plane or flat surface. Some devices offer shade in a two dimensional plane. Shade devices are typically made of a single component structure or a two component structure that can be collapsible offering an advantage to store and travel with the device. In addition to a shade there is a need of a device that can easily adapt to a structure or stand alone, also providing an optional organizer within the body of the shade, the present invention shows advantages over prior art. Shades are not typically found in a three dimensional symmetrical form that has the ability to store easily and assembly with a minimum number of components and that can readily adapt to a structure or stand-alone.

SUMMARY OF THE INVENTION

In general, the invention provides a three-dimensional shade apparatus including, a material configured to a shape, to inhibit the sun's rays from passing through the material, the shape defined by a plurality of panels individually coupled or attached to at least one side of the outer perimeter of the individual panel, configured to have a flexible member fixedly coupled to the shade's panel outer perimeter, and when the flexible member is formed in a loop and expanded defines the outer peripheral shape of the said panel. The sun shade comprising of a piece of thin flexible material, assembled with a flexible wire or rod that is configured to the outer perimeter of the panel with a bias or within the body of the material panel, where a series of panels are configured to be somewhat symmetric in shape and attached at least one side of the panel having the ability to be folded and twisted to a smaller shape than the open position. The sunshade having the provision to be folded in parts by the panel assembly, where the panels can be folded and twisted to form a compact shape.

Implementations of the invention may include one or more of the following provisions. The sunshade apparatus is configured to form a three-dimensional, adjustable structure with at lease three panels to block the sun's rays from multiple angles. The sunshade apparatus material is made of an optional water-resistant material and or UV resistant material. The sunshade material is also configured to have one or more panels constructed of a porous material or even only part of the panel to be made of mesh like flexible material, allowing air wind to pass through the sunshade three-dimensional structure and maintain the stability of the sunshade three-dimensional structure.

Implementations of the invention may also include one or more of the following features. The sunshade apparatus panel made of a thin flexible material may be configured to be symmetrical in shape, to enable the users to easily fold and store the sunshade apparatus. The symmetrical shape of a trapezoid allows the three-dimensional structure to be coupled on adjacent edges of the panel, fixed or mechanical attached by a fastener (e.g. zipper, hook and loop or snap) to minimize the gaps from allowing sunlight to enter the structure or can offer the provision an optional folding panel that provides a headrest if used on the beach or sandy surface area. The sunshade panels comprise of a solid flexible material, configured to provide optional pockets to store articles or accessories to conceal and avoid direct exposure to the sun. The sunshade panel may also be configured with a reflective material found on the outside surface of the panel, reducing the radiant heat effects of direct sunlight. Another provision of this invention is to have a panel attached with a portion of reflective material to extend from the panel and unfold to a desired length to act as a blanket, head support or improved reflective material blanket providing accelerated tanning from reflective material on areas that may not be directly exposed to light.

Implementations of the invention include a temporary storage means configured to an inner wall of the sunshade panel, where the storage means comprises of a thin flexible material forming a pocket or compartment. The pocket can be permanently attached or selectively removable from the inner panels. Yet another provision of the invention is to provide a device attached to the panel with reflective properties, configured to provide the user a feature of having a mirror attached to the inner panel, configured to provide an advantage of viewing activities outside of the three dimensional structure, or simply behind the person, while lying flat on ones stomach facing into the three dimensional sunshade structure. The storage pocket and mirror can be useful for holding lotions, tissues or other travel accessories in a beach environment or while sunbathing.

In general and aspect of the invention, he invention provides a sunshade apparatus for use with a structure, the sunshade comprises a series of substantially flat panels that are somewhat symmetric in shape, that can be folded onto each other to form a compact folded assembly, where the folded assembly can further be twisted and folded to reduce the overall size of the sunshade apparatus for portability and storage. A handle or strap can be used to secure the device from accidentally opening in the second folded state. The sunshade having a plurality of panels, at least three or more, configured to have at least two sides fixedly attached to the two adjacent panels and two sides fixedly attached to the top and optional lower panel, providing a single body that can fold and easily store. Another option for the assembled sunshade device is configured in such a way that four panels are constructed of a trapezoidal shape coupled to at least one side mating the panels to form one body, and where the panels fold onto one another to form the same shape of the panel as stacked and folded, where by the stacked panel can be twisted and folded into a compact shape, or open and temporarily fixed at two locations of the side panels to form a three-dimensional structure.

Implementations of the invention may also include an attaching means comprising of hook and loop coupled to the sunshade panel, at a desired length outside the perimeter of the sunshade panel. The attaching mechanism also may includes a second component, a clip, molded member (e.g. ground stake) or the hook and loop to secure the sunshade apparatus to the desired object or surface.

Variuos aspects of the invention may provide one or more of the following advantages. A sunshade apparatus can provide a three dimensional structure to inhibit the sun's rays from humans, pets or objects, configured from a plurality of substantially flat panels, assembled as one element and configured to be flexible and easy to store. A three-dimensional sunshade apparatus having flexible panels that can be rigidly attached by a fastening means to a mating edge of an adjacent panel and onto a structure, or to a flat planar surface. The sunshade panels may be configured to a trapezoidal shape and having the ability to be folded flat and assembled at an angular position, where a minimum of two panels edges can be coupled together by a third to form the three-dimensional structure and shade an object. The sunshade also can be configured to have panels constructed of mesh fabric that provides sunscreen, and allow the wind to pass through the material to maintain stability of the sunshade in the desired position. The sunshade can be configured to store objects in the panel having pockets or elastic materials that can secure or support objects that may be desirable to store in various applications of the invention.

Another object of the invention is to provide sunshade comprising of a three-dimensional shape configured with an organizer on at least one panel that provides storage for the consumer. Yet another object of the invention is to provide a self-standing structure with an easy to store and foldable means that can be utilized at the beach or in an outdoor environment. The shade is constructed of resilient material or a textile fabric made of nylon or alike. The shade can be constructed with multiple panels and form a body or structure that can stand on its own or be secured with a fastening means (e.g. such as hook and loop, clamps, stakes or clips). The panels can be made of a textile, of any shape desired bound to the outer periphery by a bias or held by a mechanical means, wire or fiberglass rod or spring like material that is sized to the shape of the panel and can hold the panel flat and taught. At least one edge of the panel is sewn to a second panel, and the second panel having at least one edge sewn to a third panel and so on. The number of panels can be determined by the final shape or desired structure. There may be three panels for were two side panels could hold the third panel and govern the final shape.

There may be four panels that allow the three-dimensional structure to block the sun's rays from multiple angles. There also may be a secondary fastener like a snap, a zipper or hook and loop mechanical means that can allow the consumer to set the fastener in position to construct the panels to form the three-dimensional shape desired. The sunshade panel can be made of one piece and sewn at opposing ends where the sewn area can be easily folded into a three dimensional structure. The rod or wire defines the outer periphery of the one piece for the three or four desired panels. The sunshade provides the benefit of a mirror and or a photo in a pocket. The organizer can be configured to have a hook and loop attaching means that may provide an easy assembly method to the shade panel, through a button hole stitch or onto a supporting member. Materials would be selected to block UV light with a rating of SPF 50 and also reduce heat produced in direct sunlight. The invention disclosed provides a three-dimensional shade structure that offers a unique advantage of being collapsible and portable for travel with the provisions to allow the user to shade an object or area with three dimensional screening, having the capacity to store and organize items or provide the user with a simple method of installation and stability where the device can be a stand-alone structure or mounted to an object or structure.

BRIEF DESCRIPTION OF THE DRAWINGS

These and other advantages of the invention along with the invention itself will be fully understood after review of the following figures, detailed description and drawings.

DETAILED DESCRIPTION OF THE PREFERRED EMBODIMENTS

At least some of the embodiments of the invention provide techniques for providing a device that protects objects or humans from direct sunlight, providing shade with a three-dimensional structure. Implementations of the invention may be in the form of at least three panels that are mechanically attached to create a three-dimensional structure with the panels having the ability to fold and store into a flat compact portable shape.

Figure 1:
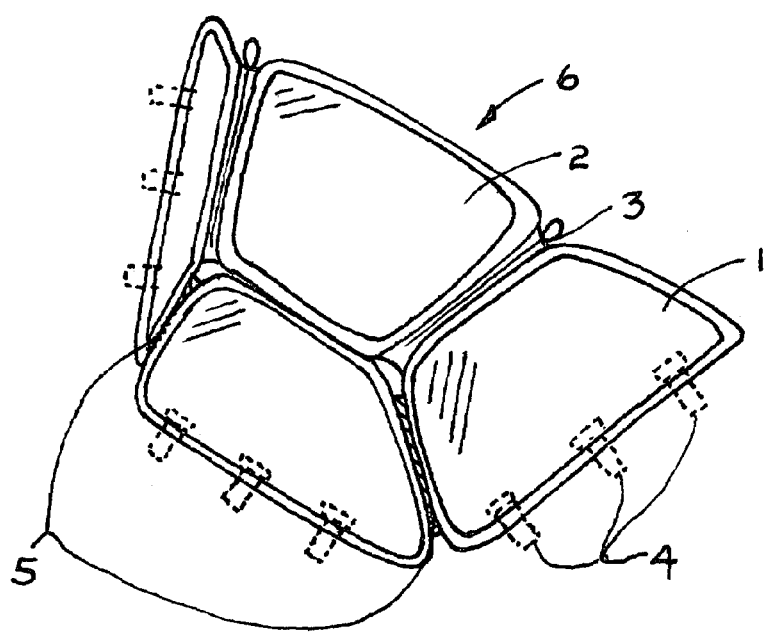
FIG. 1 is a perspective top view of the sunshade illustrated as one configuration of a three-dimensional structure.

Referring to the detailed drawings, FIG. 1 shows a sunshade apparatus 6 of the present invention with a side panel 1, a second top panel 2, a mechanically fastened edge 3, attached edges 5, where the top panel 2 is joined by the side panel 1 by a means of an attachable, detachable mechanical fastener (e.g. hook and loop, zipper, snap or like fasteners). Panels in the assembly are coupled by a permanent or non permanent mechanical means 5, all panels can be configured to be temporarily mechanically fastened by a zipper, hook and loop or a mechanical snap, or if so desired or may be stitched, welded or adhered permanently to reduce assembly labor. It is the object of the invention to permanently securely fasten at least two panels to a third, where by the remaining panels can be temporarily fastened to fold and store the device in a compact shape. The sunshade panels 1, 2 consisting of a flexible thin sheet of material, having a spring like member attached to the outer perimeter to form a closed loop and configured to hold the shape of the panel taught when expanded in the open unrestrained condition. The lower portion of the panels comprising of a plurality of assembly mechanical fastening means 4 that can easily adapt to a structure or be mechanically held into sand or soil. The assembly mechanical fastening means 4 can be a configuration of a narrow strip of flexible material, hook and loop or a tie that can be staked into the earth.

Figure 2:
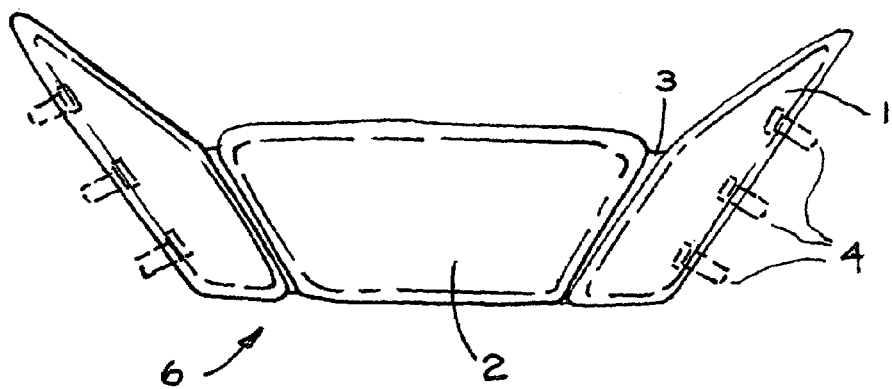
FIG. 2 is a top view of the sunshade open assembly.

Referring to FIG. 2 the sunshade apparatus 6 shown as a top assembled view with the panels forming a three-dimensional shade. The sunshade apparatus panel 1, joined by the adjacent panel and secured to the top panel 2 by a mechanical means 3 that can be detached for collapsing, folding and storing the shade in a compact shape.

Figure 3:
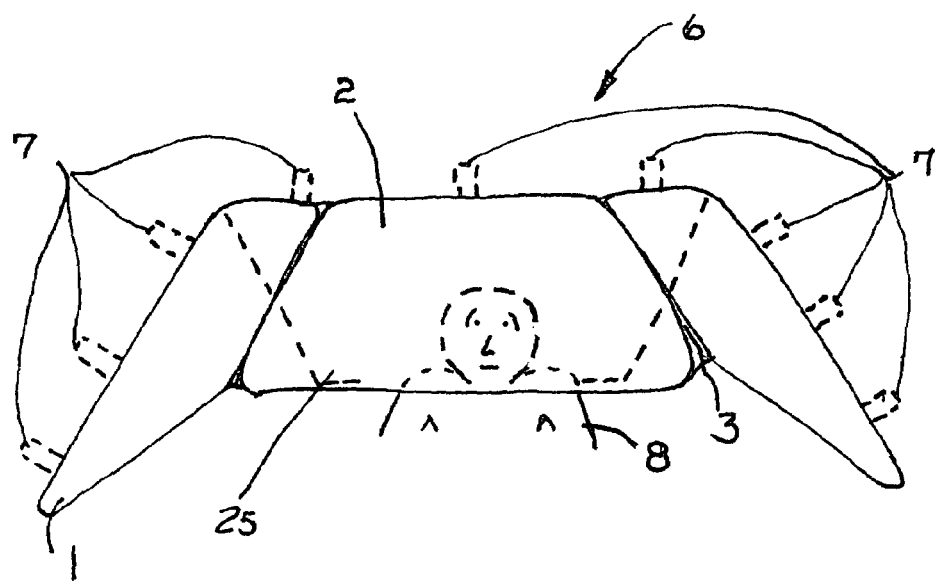
FIG. 3 is a top view of the sunshade assembly illustrating one configuration of the sunshade in use with mechanical attachments for the shade mechanically fastened to hold the three dimensional shape on a portion of the shade perimeter.

As FIG. 3 illustrates a top assembly view of the invention sunshade apparatus 6, mechanical fastener 3, with the top panel 2 shading the object or person 8 in the three-dimensional structure formed by panel 1, and the attached adjacent panels, fixed by a mechanical means 7. This structure of the sunshade apparatus 6 can be conveniently used and positioned to block the sun's rays at a plurality of angles. This apparatus is configured to have at least four panels in this configuration and may also be configured to have a fifth panel 25 that would offer a head support, material surface or a reflective material member (e.g. foil, foil with non woven back or like materials) that may extend out from the panel, or attach to the panel to improved tanning of the body. The option for a fifth panel would require the panel 25 to be foldable and or removable, preferably not fixed where the structure would not be easy to fold and store.

Figure 4:
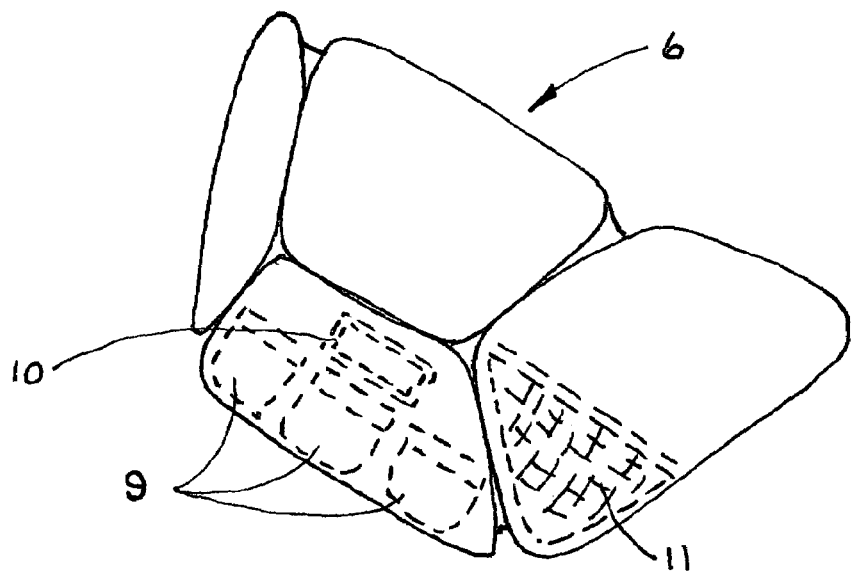
FIGS. 4-6 are perspective views of alternative shade structures.

As shown in FIG. 4 the sunshade apparatus 6 is presented in a perspective view showing the storage capacity on the panels of the sunshade side 11 rear panel 9 for storing articles that should not be placed in direct sunlight and an optional mirror 10 that can be useful to the user for viewing behind the body while lying on their stomach or side or even as an activity mirror is used on a structure for a young infant or child.

Figure 5:
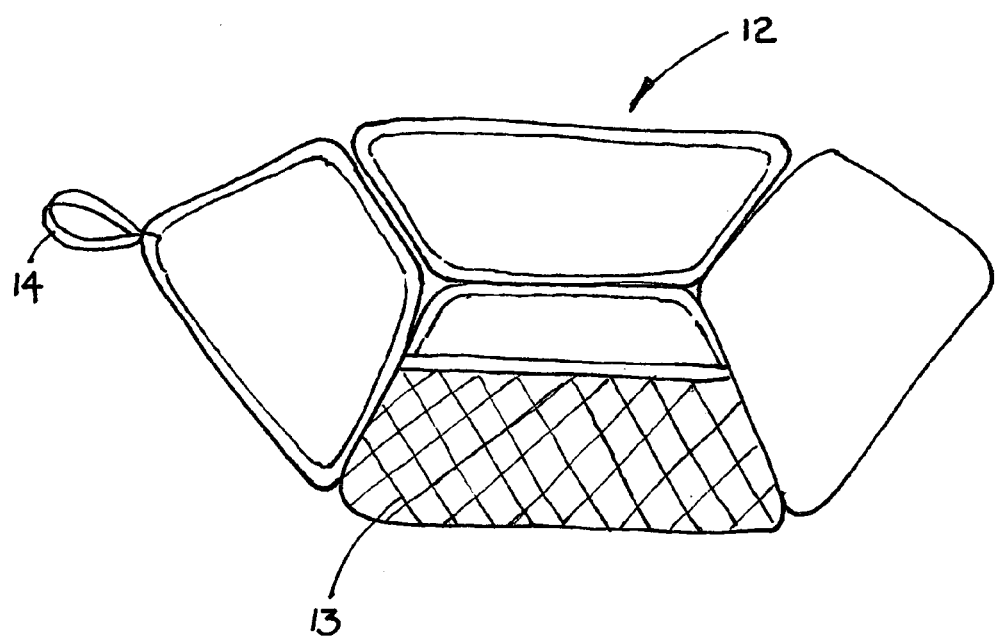

Referring to FIG. 5 the sunshade apparatus 12 configured with a mesh panel 13 and a loop 14 that can be utilized as a handle or to secure the assembly in the folded position. The mesh panel 13 can be configured as a full mesh panel or a partial mesh panel of material having the ability to screen the sun's rays, and support the three-dimensional shade structure where wind or weather conditions may have an effect on the stability of the sunshade apparatus.

Figure 6:
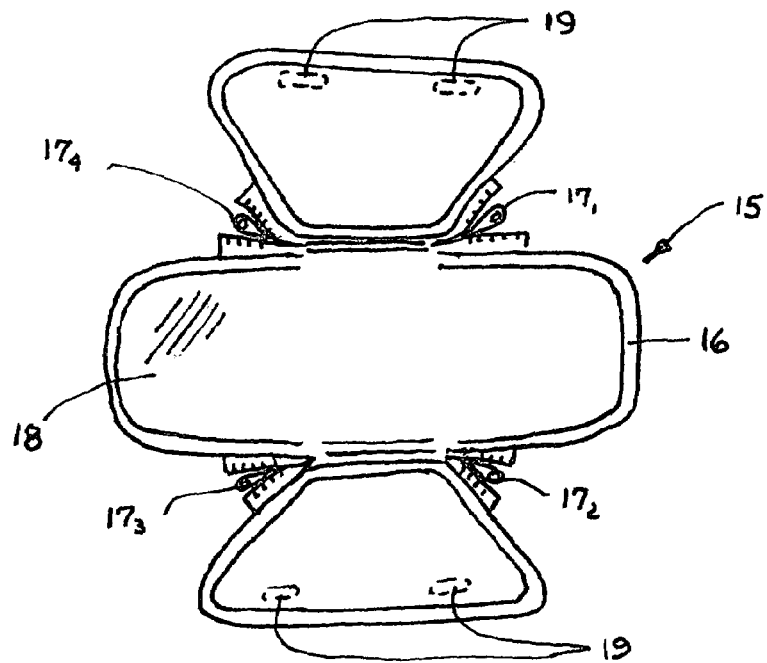

Referring to FIG. 6 the top plane view of the three component sunshade apparatus 15, including a outer periphery spring material 16 secured to the body of the panel 18 were the mechanical fasteners 17 are located in a position to be selectable secured to form a three dimensional shape for shading an object. The attaching means provision 19 is illustrated on the two side panels for securing the shade to a structure or allowing standing on its own. The two opposing panels are coupled to the main body 18 and can be made of mesh material, where the main body would comprise of a UV resistant material or SPF rated material to block the sun's rays.

Figure 7:
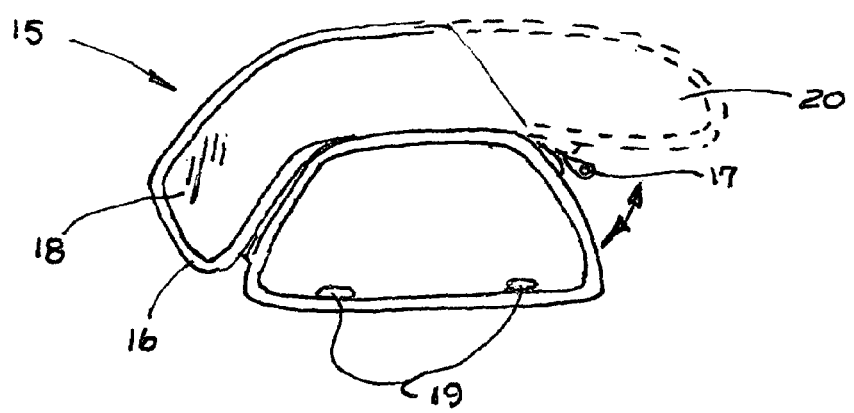
FIG. 7 is a side perspective view of a sunshade of FIG. 6 in a three-dimensional assembly showing one end of the shade assembly open and extended.

Referring to FIG. 7 the side perspective view of the three component sunshade apparatus 15, assembled in a three-dimensional shape, where the body 18 forms a top portion to screen the sun's rays and the mechanical fastener 17 is securely fastened to hold the desired shape. The main body 18, shown in hidden 20 not secured at one end to offer an extended area of sun screening capability. The attaching means 19 shown in the illustration where is sunshade accessible to be fixed or stand on its own.

Figure 8:
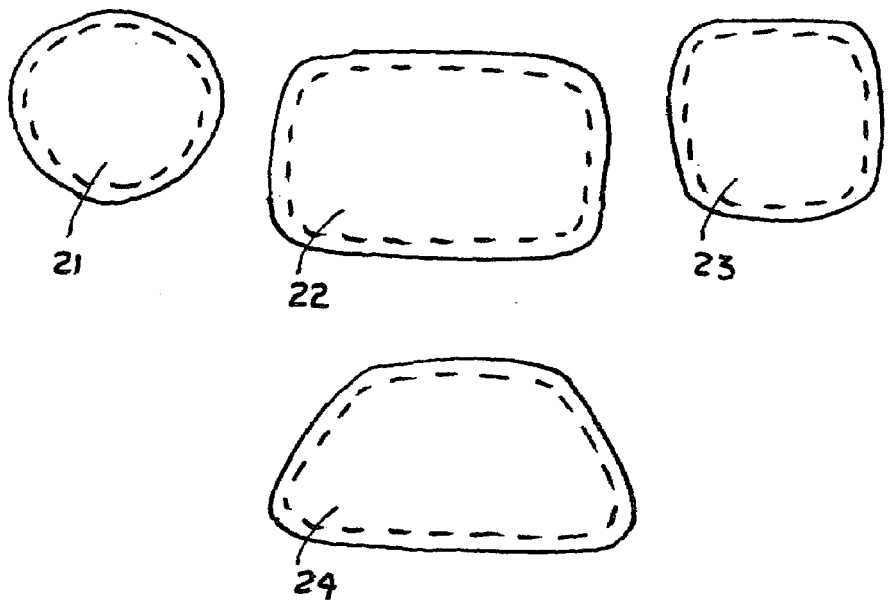
FIG. 8 is a front view of various configurations of the optional sunshade panels.

Referring to FIG. 8 the top view of the various shapes and configurations for the panels 21, 22, 23, 24 respectively shown. The advantage of the trapezoidal shape 24 enables the manufacturing of the shade to be configured with minimum components to maximize the blocking of sun light through the gaps. Where the other shapes may require added materials to do the same.

Figure 9:
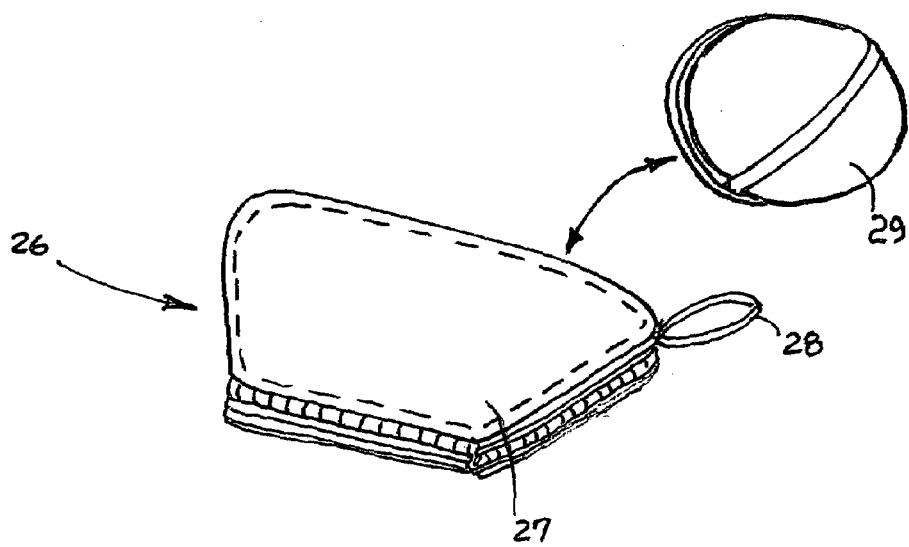
FIG. 9 is perspective view of one configuration of the folded stacked panels and folded compact sunshade

Referring to FIG. 9 a top perspective view of the folded panel assembly 26, where the panels 27 are folded onto each other at the adjacent panels and securely fastened to erect an three-dimensional structure, but also have the capacity to fold and store into a compact shape 29 and temporarily secure by a strap or loop 28.

Still other embodiments are within the scope and spirit of the appended claims.

What is claimed is:

1. A shade apparatus comprising:
    four resilient, flat, substantially symmetric panels configured to attach to a rigid body and form a three dimensional structure that is further configured to provide shade within a defined area inside the said panels; and
    each of the symmetric panels comprises a spring like member, securely fastened to the outer periphery of the panels to define the shape of the said panels;
    a first, top panel permanently attached and pivotally movable about a second, rear panel; and
    a third, right side panel is permanently attached and pivotally movable about the second, rear panel; and
    a fourth, left side panel opposite of the third, right panel is permanently attached and pivotally movable about a second, rear panel; and
    a fastener is configured to temporarily securely fasten the said third, right and fourth, left side panels at the respective edges thereof to respective adjacent mating edges of the said first, to form a three dimensional shade;
    the plurality of panels are configured to rotate and fold about attached mating adjacent edges from one panel onto another and conveniently form a stacked flat two dimensional symmetrically shaped panel.

2. The shade of claim 1 where the panel comprises water resistant material.

3. The shade of claim 1 where the flexible panel material is UV inhibiting.

4. The shade of claim 1 where the panels are trapezoidal and configured with a portion of mesh material to minimize the effects of wind.

5. The shade of claim 1 wherein one panel is configured with a pocket.

6. The shade apparatus of claim 1 wherein the panels are configured with reflective material.

7. A shade apparatus comprising:
    a shade panel assembly configured with a resilient light inhibiting material, a spring like member securely fastened to the outer periphery of the said shade panel to define the shape of the said shade panel;
    the shade panel comprising a main body panel of substantial length and surface area configured to shade an area within the said shade panel structure;
    the shade panel further comprises two disposed side panels, substantially flat in shape and unitary in structure wherein the side panels are symmetrically shaped, and are attached to opposing sides of the main body;
    the said side panels integrally attached to said opposing sides of the said main body panel and are further configured to be rotatably coupled and movable about the area of attachment to the main body panel, located in the vicinity of the mid section of said main body panel;
    the side panels and main body panel have releasable fastening devices attached to a portion of the said side panels and the said main body panel peripheral mating edges, were the peripheral mating edges are defined by a portion of each side panels outer peripheral edge and the main body panel outcry peripheral edge when the said side panels are rotated and the said main body panel is deflected on a point that the adjacent edges are aligned, and further have the ability to selectively attach and detach a portion of the outer peripheral edge of the said panels to form an assembly that can be configured as a three dimensional shade structure; and
    the said side panel assembly can be securely fastened to another member by fastening means configured to a portion on the said side panel assembly opposite the edge that is attached to the main body panel;
    wherein the shade structure is configured to shade an object inside the shade apparatus and fold and store flat for transport, handling or storage.

8. The shade apparatus of claim 7 wherein the panels comprise of water-resistant, ultra violet inhibiting material.

9. The shade apparatus of claim 7 wherein a panel is configured with a storage pocket.

10. The shade apparatus of claim 7 wherein the panels are comprise of a reflective material.

11. The shade apparatus of claim 7 wherein a fastening device comprises of a zipper.

* * * * *